April 3, 1962　　　F. W. STEIN　　　3,028,549
TEST CELL IMPROVEMENT
Filed Aug 10, 1959　　　2 Sheets-Sheet 1

INVENTOR.
Frederick W. Stein
BY
ATTORNEY.

April 3, 1962  F. W. STEIN  3,028,549
TEST CELL IMPROVEMENT
Filed Aug. 10, 1959  2 Sheets-Sheet 2
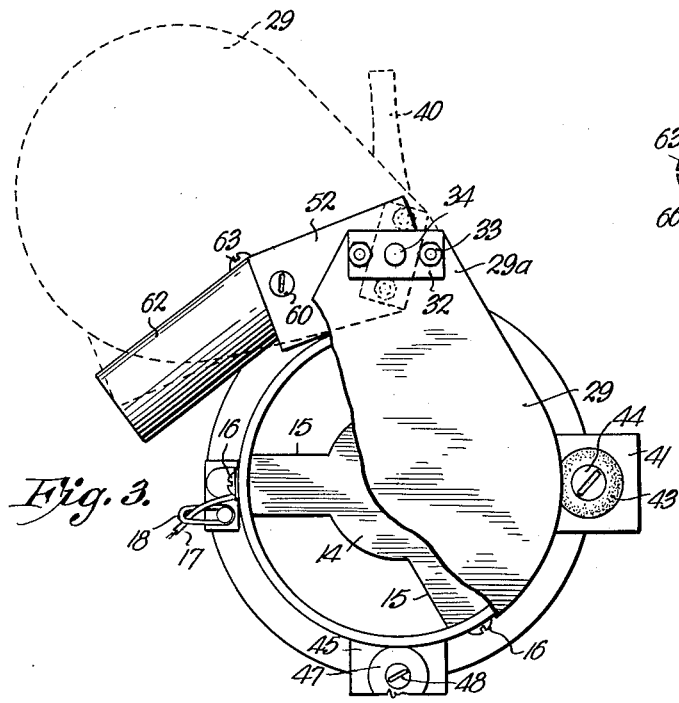
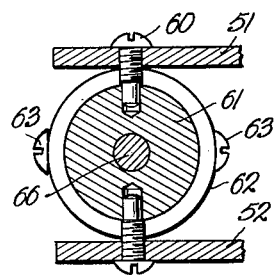
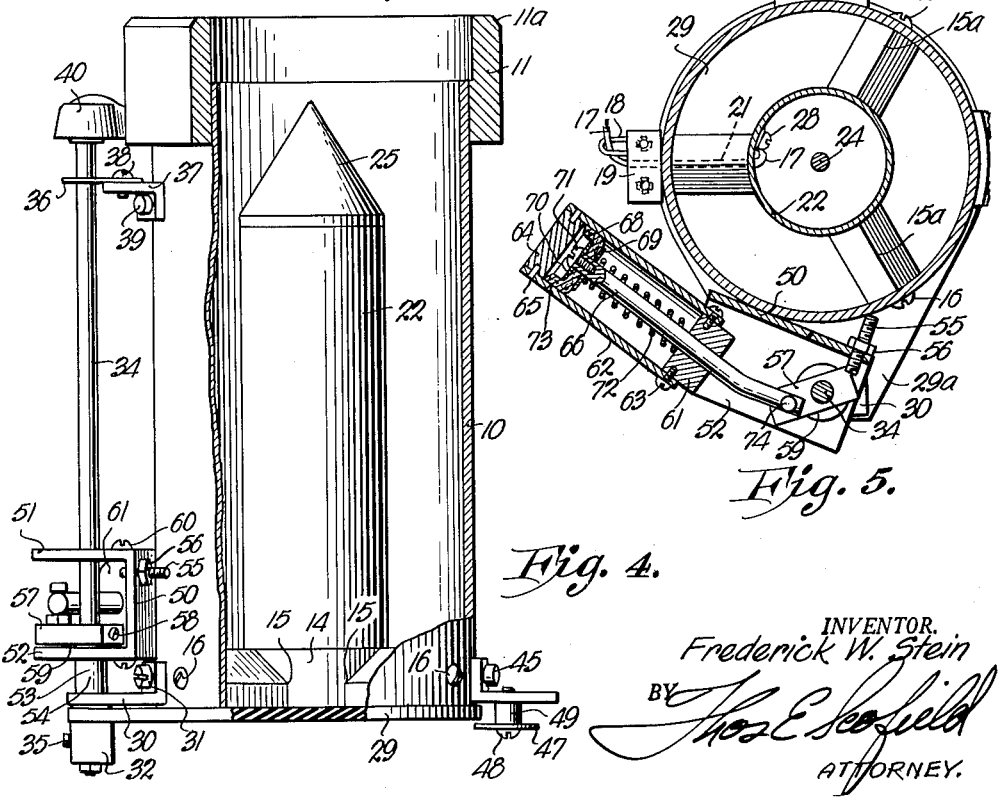
INVENTOR.
Frederick W. Stein
BY
ATTORNEY.

United States Patent Office 3,028,549
Patented Apr. 3, 1962

3,028,549
TEST CELL IMPROVEMENT
Frederick W. Stein, Atchison, Kans., assignor to Fred Stein Laboratories, Inc., Atchison, Kans., a corporation of Kansas
Filed Aug. 10, 1959, Ser. No. 832,527
4 Claims. (Cl. 324—61)

This invention relates to apparatus for performing electrical tests on fluent materials and refers more particularly to improvements in the structure and discharge means of such apparatus designed to receive fluent materials from uniform fall-producing apparatus.

This application is a continuation-in-part of and improvement over my application Serial No. 681,676, filed September 3, 1957, entitled "Test Cell," and now Patent No. 2,947,940.

An object of the invention is to provide an improved sample receiving cell which can be used in conjunction with known test circuits to perform the desired tests on fluent materials rapidly, efficiently and reliably.

Another object of the invention is to provide a test cell which can be loaded with the test material and unloaded very quickly, easily and efficiently; and in which tests on different specimens of a given material can be carried out successively in a relatively short time.

Another object of the invention is to provide such testing apparatus which is economical to manufacture, trouble free in operation and extremely easy to use in a manner which will give accurate and reliable results.

Another object of the invention is to provide apparatus for test cells employing a central post electrode and a peripheral tube electrode wherein the post is supported by the tube, yet the support means offer a minimum obstruction and interference with the fall of the fluent material into the test cell, thus minimizing the variations in pack encountered with different samples.

Another object of the invention is to provide a test cell employing a central post electrode and a peripheral tube electrode with the post electrode supported by the tube, wherein the means for emptying the cell requires movement of neither of the electrodes, yet easily, quickly and conveniently empties the cell.

Another object of the invention is to provide a test cell of extremely simple construction wherein all of the parts are readily accessible for cleaning or repair.

Another object of the invention is to provide a test cell with means for emptying the cell which always provides a uniform depth for the cell and wherein rough use and handling over a long period of time of the means for emptying the cell does not affect the depth of the cell when it is closed to receive a sample.

Still another object of the invention is to provide a bottom-closing door for a test cell which will always open fully (because the operator has to exert less force at and approaching the fully open point than when initiating the door-opening action).

Another object of the invention is to provide means for returning a bottom closing door for a test cell to the closed position which exerts a greater force as the door approaches said closed position whereby to make sure the door is always completely seated in the closed position.

Still another object of the invention is to provide supporting means for a central post electrode in a peripheral tube electrode which does not permit catching of fluent material under the electrodes as the door is opened, provide a substantially more uniform pack than heretofore, and, also, does not permit retention of fluent material within the cylinder after emptying.

Still another object of the invention is to provide a test cell with a door-returning mechanism which applies considerable force to the door to return it to the closed position, yet does not sufficiently shock the cell and casing attached thereto to disturb any meters attached to the main casing.

Other and further objects of the invention will appear in the course of the following description thereof.

In the drawings, which form a part of the instant specification and are to be read in conjunction therewith, an embodiment of the invention is shown and, in the various views, like numerals are employed to indicate like parts.

FIG. 3 is a bottom plan view of the test cell of FIG. 1 with the bottom closing door shown in the closed position in full lines and in the open position in dotted lines.

FIG. 4 is a side, partly sectional view of the test cell of FIG. 1 with the view taken from the three o'clock position of FIG. 1.

FIG. 5 is a view taken along the line 5—5 of FIG. 2 in the direction of the arrows.

FIG. 6 is a view taken along the line 6—6 of FIG. 2 in the direction of the arrows.

Figure 1:
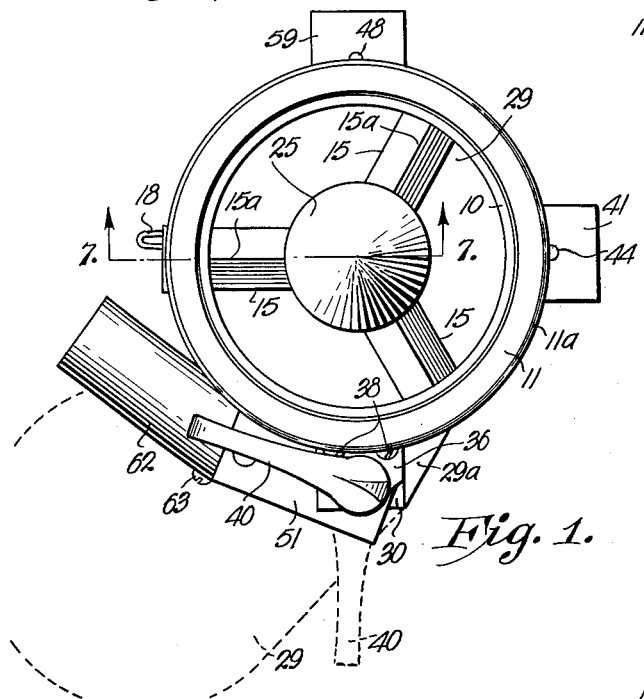
FIG. 1 is a top plan view of a construction embodying the invention with the bottom closing door of the test cell shown closed in full lines and open in dotted lines.
Figure 7:
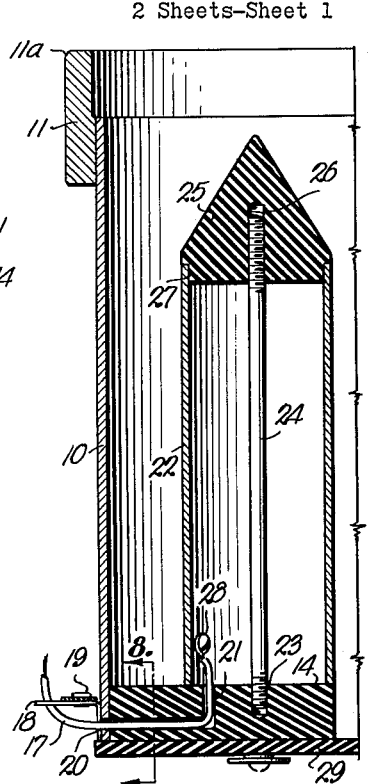
FIG. 7 is a view taken along the line 7—7 of FIG. 1 in the direction of the arrows.

Referring to the drawings, a cylindrical tube 10 of electricity conducting material has upper greater internal diameter ring 11 removably fixed thereon by such means as set screws 12 (FIG. 2) which engage threaded passages 13 through ring 11. The upper outside face of the ring is preferably beveled as at 11a. Ring 11 tightly fits around the outer upper surface of the tube 10.

Figure 8:
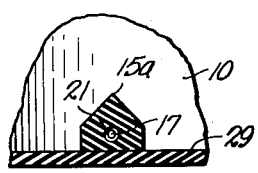
FIG. 8 is a view taken along the line 8—8 of FIG. 7 in the direction of the arrows.

Referring particularly to FIGS. 1, 3 and 4, a cylindrical block 14 of electrical insulating material (such as Bakelite, etc.) is fixedly mounted inside of tube 10 by three equally spaced horizontal posts or spokes generally designated at 15. Spokes 15 are also formed of electrical insulating material, optionally of the same material as the block 14 and the entire assembly may be integrally molded in one piece. Spokes 15 are rigidly but removably fixed into the tube 10 by screws or bolts 16. The bottom edge of the spokes is preferably of a width in cross section equal to or greater than any other portion thereof and also preferably positioned flush with the bottom of the block 14 and tube 10. The top edges 15a of the arms or spokes 15 are preferably tapered to a point in cross section (FIG. 8).

FIGS. 3, 5, 7 and 8 show the manner in which an electrical lead 17 is carried through one of the posts 15a and into and through block 14. Lead 17 passes through loop 18 carried by clip 19 fixed to tube 10 by screws 16. Lead 17, which is covered by suitable insulation, passes through opening 20 in tube 10, passage 21 in spoke 15a and block 14, and out above the upper surface of block 14.

Hollow cylindrical tube 22 is mounted on block 14 coaxial therewith and extending thereabove. Block 14 has centrally thereof an internally threaded opening 23 to receive rod 24 externally threaded at both ends thereof. A conical pointed block of electrically nonconducting material (such as Bakelite) having internally threaded opening 26 in the lower central portion thereof is removably mounted on the upper portion of rod 24 and has circumferential groove 27 in the lower outer edge thereof to receive the upper end of tube 22. Screw 28 on the inner surface of tube 22 fixes lead 17 to the inner wall of tube 22.

The electrical circuit to be employed with this test cell is not a part of the instant invention and thus will not be described. However, the circuit shown in my Patent No. 2,251,641, entitled "Apparatus for Testing Materials" issued August 5, 1941, is operable with this device for the purposes described in that patent.

The instant test cell is designed to preferably work in conjunction with a test cell releasing device of the character described in my application Serial No. 681,742, filed September 3, 1957, entitled "Test Cell Release Loading Device," and now Patent No. 2,987,227. The latter mechanism is intended to achieve an even, free fall of the material to be tested into a testing cell. The instant cell is designed for preferably testing the moisture content, etc. of whole grain materials of a nonabrasive character such as corn. However, sand, hard ground corn, coarse ground chops, crushed rock, etc. may be tested in the inventive device due to the particular form of the spokes supporting the central electrode. The absence of spokes supporting the upper portion of the central electrode permits an undisturbed uniform fall of the material to be tested into testing cylinder 10. Spokes 15, at the bottom of the cell, disturb to some extent a uniform fall and pack into this area. However, the testing area of the cell is limited to that between tube 22 and outer tube wall 10 above block 14 and arms 15. By providing insulated block 14 of a height at least equal to the height of spokes 15, testing of the area around the spokes is avoided and the irregularity of the corner falls becomes unimportant.

Referring particularly to FIGS. 1, 2, 3, 4 and 5, the inventive mechanism for opening and closing the lower end of tube 10 is shown. An oval door 29 is formed of sufficient size in the body thereof to completely close off the lower end of tube 10 when the door is in closed position. An extension 29a extends past the side of the lower end of the tube under mounting flange 30. Flange 30 is fixed by a right angle portion thereof to tube 10 immediately above the lower end of the latter by screws 31. Shaft engaging block 32 is removably bolted to door portion 29a by bolts 33.

An elongate shaft 34 extends through an opening (not shown) in flange 30 and is rigidly fixed in block 32 by set screw 35. Thus, rotation of shaft 34 rotates block 32 and door 29 therewith. Shaft 34 is received, adjacent its upper end, in an opening (not shown) through upper flange 36 which is adjustably fixed on upper attachment flange 37 by screws or bolts 38 threaded into internally threaded openings in flange 37 and passing through slots in flange 36. Flange 37 is itself fixed to the side of tube 10 by screws or bolts 39. Handle 40 is fixedly attached to the upper end of shaft 34 and preferably stands in the position shown in FIG. 2, next ring 11, when door 29 is closed as in FIG. 2. Rotation of the handle 40 in counterclockwise direction in FIG. 1, toward the viewer in FIG. 2, and in a clockwise direction in FIG. 3, will move the door 29 from closed to open position.

Figure 2:
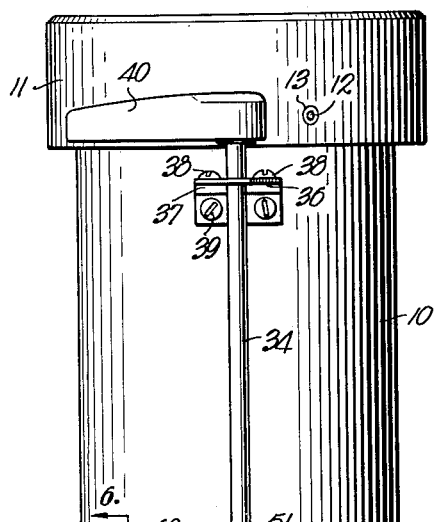
FIG. 2 is a side view of the device of FIG. 1 looking at the side which is down in FIG. 1.

Referring to the lower right-hand corner of FIG. 2, L-shaped mounting flange 41, fixed to tube 10 adjacent the bottom thereof by screws 42, mounts resilient rubber or other deformable bumper 43 by bolt 44. Bumper 43 serves to cushion the return of door 29 to the closed position. Referring particularly to the lower right-hand corner of FIG. 4, L-shaped mounting flange 45, fixed to tube 10 adjacent the lower end thereof by bolt or screw 46, mounts door retainer disc or flange 47 by bolt 48, spacing disc 47 below the lower surface of door 29 and out of contact thereof by spacer 49. As the door 29 is suspended only by shaft 34, disc 47 operates to brace the opposite side of the door against any unforeseen weight application from above.

Means are provided to (1) constantly retain the door 29 in closed position, (2) return the door 29 to a closed position from an open position, (3) require a greater application of force to open the door at the beginning of the opening process than at the end thereof and (4) apply a greater amount of force to the door in closing as it approaches the closed position rather than when it is starting toward the closed from the fully open position. Additionally, means are provided to cushion in regulated fashion the motion of the door in both opening and closing action. These means will be now described.

Mounting clip 50, C-shaped in cross section, has upper outwardly extending flange 51 and lower outwardly extending flange 52. Openings are provided in each of said flanges to permit the passage therethrough of rod or shaft 34. A sleeve 53 is fixed by set screw 54 to shaft 34. Clip 50 rests on sleeve 53 and has screw 55 adjustable by nut 56 engaging a threaded opening in the rear wall of clip 50 to rigidly and fixedly position clip 50 relative to the tube 10.

A bar or arm 57 is rigidly fixed to shaft 34 by set screw 58 whereby to rotate therewith, arm 57 positioned immediately above flange 52 and spaced therefrom by shim or bearing 59.

Referring particularly to FIGS. 2, 5 and 6, screws 60 pivotally fix the end plug 61 of a dashpot (whose side cylindrical wall is indicated at 62) to the flanges 51 and 52. Set screws 63 fix side wall 62 of the dashpot to end plug 61, while opposite end plug 64 is attached by rivets 65 or other attachment means in the other end of wall 62.

Piston shaft 66, straight in its dashpot received length but crooked as at 67 therebeyond, has leather or other suitable substance plunger 68 fixed thereon between two washers 69 and 70 by screw 71 fitted into a threaded opening in the end of piston rod 66. Resilient spring 72 abuts the inner face of plug 61 and washer 69 whereby to tend to maintain the piston rod 66 and plunger 68 in the position of FIG. 5 (the position in which door 29 is in closed position). Air release opening 73 is provided in side wall 62 of the dashpot to bleed off and flow in air under regulated pressure to control the rate of motion of the plunger 68 in the dashpot cylinder. The outer end of rod 66, past crook 67 therein, is pivotally attached by bolt 74 to arm 57.

In operation of the inventive device, it is of extreme importance that the test cell have uniform depth from test to test. Door 29 provides a constant, uniform depth for the cell. The bottom surface of block 14 is substantially flush with the bottom surface of tube 10, as are the bottom surfaces of arms or spokes 15. Therefore, panel or door 29, when closed, will contact or nearly so the bottom of tube 10, the bottom surfaces of block 14 and spokes 15a. No greater clearance than 1/64 of an inch between the door and the members immediately previously listed should be permitted. Fatigue of spring 72 has no effect on the depth of the test cell. Once the sample has been dropped into the cell, the appropriate electrical potential may be applied across the cell in the manner disclosed in my Patent No. 2,251,641, above. Handle 40 is then rotated in a counterclockwise direction in FIG. 1 (clockwise in FIG. 3), thus sliding door 29 through its connection with rod 34 counterclockwise in FIG. 1 and clockwise in FIG. 3. Material which has been tested in the cell falls out as the door moves out of the way and, as it retracts fully from the bottom end of the tube 10, all of the material in the cell can fall free. The sharp upper edge of the rods 15 prevents any retention of material in the cell thereon. Spring 72 returns door 29 to abutment with buffer 43 and the test cell is again sealed in its bottom end for the receipt of another sample.

The action of the dashpot-spring combination and the pattern of exertion of force on the rod 34 and thus door 29 will now be more fully analyzed. In the first place, starting from the positions of FIGS. 2 and 5, as rod 34 is rotated in a counterclockwise direction in FIG. 5, arm 57 pulls rod 66 out of the dashpot. It should be noted that, in addition to the component of motion or force which arm 57 exerts in drawing arm 66 from the dashpot, there is also a small outward (downward in FIG. 5) component of motion. This causes the freely pivotable dashpot to move (in the end 64 thereof) slightly toward wall 10 until rod 66 has been moved its maximum distance outwardly from the inner wall of clip 50. However, in the first 45° of travel (starting from the initial position of FIG. 5), arm 57 effects substantially a direct pull-out of rod 66 from the dashpot. Once arm 57 has moved approximately 45° to 50°, a component of motion, increasing in magnitude, moves the free end of rod 66 where engaged by pin 74 from a position away from wall 10 and clip wall 50 toward the same. Thus, in the last stages of travel of rod 57, as pin 74 moves past the rod 57 and then moves inwardly therepast, a lesser quantity of the motion created by the rotation of rod 34 is devoted to pulling the dashpot rod 66 from the dashpot and more devoted to inward movement of the free end thereof. In this latter stage, the outer end 64 of the dashpot pivots outwardly somewhat from the position of FIG. 5.

Thus, in the first stage of motion, the door is harder to open and in the last stage, it is easier to open as, in the last stage, one is not fighting the spring and vice versa. Conversely, when the handle is released, the door at first moves more slowly and has a lesser force applied thereto as the spring action is less per unit movement of the door than when the door approaches the closed position.

These forces have two practical results. In the first place, one must exert considerable force to open door 29 and, once this initial force is exerted, as the force eases, applied momentum tends to carry the door to the full open position and effect full dumping of all material from the tube. This is important, as, occasionally, in other opening mechanisms, the door is not fully opened and traces of previous samples or substantial quantities thereof remain in the chamber. Secondly, since it is at all times of crucial importance to seal the door after emptying the cylinder, a greater force acts to finally close the door as it approaches the closed position and thus a complete and accurate closing of the door is assured. While the dashpot action may slow the velocity of motion of the door, both opening and closing, the quantity of force applied remains greater at the initial opening or at the final closing and thus the desired action is achieved.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth is to be interpreted as illustrative and not in a limiting sense.

Having thus described my invention, I claim:

1. In a test cell for fluent materials a pair of spaced apart electrodes, one electrode comprising an upright post, the other a hollow tube defining the body of the cell open at its upper and lower ends, a door for the lower end of the said tube, means pivotally mounting the door for swinging motion in the direction substantially normal to the axis of said tube, said mounting means entirely exteriorly positioned of said tube and mounted relative to the exterior thereof, whereby said door will slide relative to the lower end of the tube and alternately completely open and completely close off said end, resilient means normally urging the door into closed position, said resilient means operative to exert a greater force for closing said door when the door is in and adjacent its closed position and a lesser force toward closing said door when the door is in and adjacent to its open position.

2. Apparatus as in claim 1 wherein said mounting means comprises at least one flange on said tube, a shaft parallel to the tube axis rotatably carried by said flange and attached to one side of said door, and the resilient means comprises a spring-loaded shaft connected to the shaft mounting the door, the spring-loaded shaft crooked when viewed along the axis of the shaft mounting the door, and means for receiving in abutting fashion the spring on the spring-loaded shaft, said latter means pivotally mounted relative to said tube.

3. In a test cell for fluent materials, a pair of spaced apart electrodes, one electrode comprising an upright post, the other a hollow tube defining the body of the cell open at its upper and lower ends, a door from the lower end of said tube, means pivotally mounting the door for swinging motion in the direction substantially normal to the axis of said tube, said mounting means entirely exteriorly positioned of said tube and mounted relative to the exterior thereof, whereby said door will slide relative to the lower end and alternately open and close off said end, resilient means normally urging the door into closed position, and hydraulic cushioning means for controlling the rate of closure of said door under action of said resilient means.

4. Apparatus as in claim 3 wherein the resilient means exerts a greater force for closing the door when the door is in its closed position and adjacent thereto and a lesser force for closing said door when the door is in its open position and adjacent thereto.

References Cited in the file of this patent

UNITED STATES PATENTS

| 65,430 | Putnam | June 4, 1867 |
| 288,066 | Kessler | Nov. 6, 1883 |
| 1,329,199 | Myers | Jan. 27, 1920 |
| 1,524,585 | Shutterly | Jan. 27, 1925 |
| 2,115,033 | Mitchell | Apr. 26, 1938 |

FOREIGN PATENTS

| 116,478 | Australia | Feb. 4, 1943 |